US010909788B2

(12) United States Patent
Burris et al.

(10) Patent No.: US 10,909,788 B2
(45) Date of Patent: Feb. 2, 2021

(54) SECURE ZONE ACCESS CONTROL

(71) Applicant: NCR Corporation, Atlanta, GA (US)

(72) Inventors: Matthew Robert Burris, Atlanta, GA (US); Sudip Rahman Khan, Decatur, GA (US); Jodessiah Sumpter, Roswell, GA (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 16/382,946

(22) Filed: Apr. 12, 2019

(65) Prior Publication Data
US 2020/0327755 A1 Oct. 15, 2020

(51) Int. Cl.
G07C 9/00 (2020.01)
G06F 21/32 (2013.01)
G06F 21/31 (2013.01)
G06F 21/34 (2013.01)
G06F 21/45 (2013.01)

(52) U.S. Cl.
CPC ....... G07C 9/00563 (2013.01); G06F 21/316 (2013.01); G06F 21/32 (2013.01); G06F 21/34 (2013.01); G06F 21/45 (2013.01)

(58) Field of Classification Search
CPC .............................. H04L 63/0861; G06F 21/32

USPC ....................................................... 340/5.53
See application file for complete search history.

(56) References Cited

U.S. PATENT DOCUMENTS

| 2008/0101658 | A1* | 5/2008 | Ahern .................. G06K 9/6217 382/115 |
| 2016/0035198 | A1* | 2/2016 | Coviello .......... G08B 13/19695 340/541 |
| 2016/0189455 | A1* | 6/2016 | Lee .......................... G07C 9/37 340/5.52 |
| 2016/0301691 | A1* | 10/2016 | Miller ...................... G01S 5/14 |
| 2016/0308859 | A1* | 10/2016 | Barry ...................... G07C 9/22 |

* cited by examiner

Primary Examiner — Fabricio R Murillo Garcia
(74) Attorney, Agent, or Firm — Schwegman, Lundberg & Woessner

(57) ABSTRACT

Cameras capture time-stamped images of predefined areas (zones) and assets (objects). Behaviors and actions of persons are tracked in the images with respect to the zones and the objects based on rules. Persons are identified when the behaviors or actions indicate that the persons are attempting to access a particular zone or a particular object. Multifactor authentication is performed on the persons based on the rules and access to the particular zone or the particular object is granted or denied. All access attempts along with the corresponding images associated with the access attempts are logged for auditing.

20 Claims, 5 Drawing Sheets

SECURE ZONE ACCESS CONTROL

BACKGROUND

Although authentication techniques have evolved and are deployed with a variety of different technologies, there remains many areas of business that have had relatively few authentication-based improvements.

For example, a bank branch has security and audit procedures that remain substantially manual and rely on trusted human relationships based on the bank personnel. To minimize reliance on personnel, many bank procedures require two individuals to be present to gain access to designated areas/assets of the bank branch. The belief is that it is more difficult and more unlikely that theft will occur if multiple designated employees are both required to gain access to a secure area/asset of the bank (such as the safe or cabinet access to an Automated Teller Machine (ATM)). The two-person requirement also improves the accuracy and reliability of auditing by the bank when theft is detected.

However, the two-person access requirement creates substantial interruptions during work hours to the personnel. When one employee has a legitimate need to access a secure area/asset of the bank, another authorized or designated employee has to be physically present to provide the access. This means that the second employee is disrupted and must stop working and physically accompany the employee that needs access. Still further, banks require all secure area/asset access events be manually logged upon access, when access is completed, and audited upon closing each business day. So, the employees that were required for the secure area/asset access must also make entries into and validate an audit log for the area/asset.

If the designated employees are out of the office when another employee needs area/asset access, then the requesting employee may not gain access to the area/asset. This means that banks must ensure that designated employees are always present during business hours, which is not easy to achieve when sicknesses and unexpected events arise for the designated employees.

As a result, the two-person requirement is burdensome to the designated employees and costly for the bank to maintain.

SUMMARY

In various embodiments, methods and a system for secure zone access control are presented.

According to an embodiment, a method for secure zone access control is presented. A person is tracked and identified in front of or adjacent to a zone from images using rules. A determination is made that the person initiated an access request to the zone based the rules. An identity of the person is identified from the images based on the access request. Authentication rules are obtained for the zone based on the identity of the person. The authentication rules are processed and access is provided to the zone when the person is successfully authenticated from processing the authentication rules.

DETAILED DESCRIPTION

Figure 1:
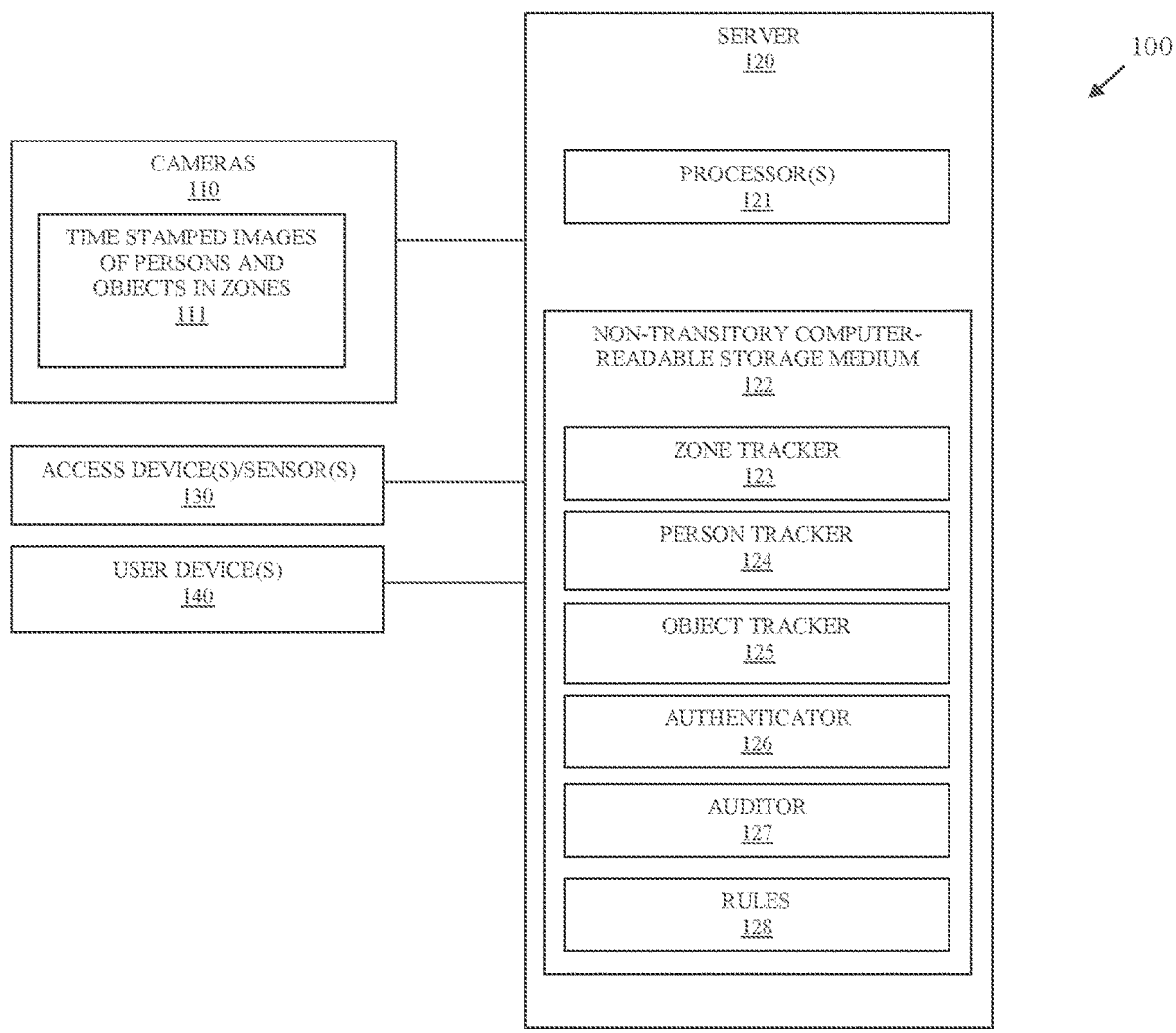
FIG. 1 is a diagram of a system for secure zone access control, according to an example embodiment.

FIG. 1 is a diagram of a system 100 for secure zone access control, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of secure zone access control, presented herein and below.

As used herein and below, the terms "user," "personnel," "operator," "person," and "requestor" may be used interchangeably and synonymously. The terms refer to an individual attempting to gain access to a secure zone or secure access.

The term "zone" refers to a predefined area or an enterprise that is being monitored within images captured by cameras/video cameras. The entire area may be monitored through the images or just pre-designated objects within portions of the area.

An "object" refers to a secure asset that is being monitored within the images. An object may be a device represented in the images, a log book, a drawer, a desk, a safe, etc.

System 100 includes a plurality of cameras 110 that capture time-stamped images of persons and objects in zones (herein after just "images 111"). System 100 also includes server 120, access device(s)/sensor(s) 130, and optionally user-operated device(s) 140. Server 120 includes executable instructions that execute on one or more hardware processors 121 of server 120 from a non-transitory computer-readable storage medium 122 as: zone tracker 123, person tracker 124, object tracker 124, authenticator 126, and auditor 127. Non-transitory computer-readable-storage medium 122 also includes rules 128.

It is to be noted that there may be multiple servers 120, such that the different elements 123-127 may execute on a same server 120 or multiple different servers 120 networked together.

Cameras 110 are preconfigured to capture images 111 of the defined areas (zones) based on the field-of-view of the lenses of cameras 110. Some of cameras 110 may capture images 111 representing portions of a different area that a different one of the cameras 110 captures images 111 for. That is, each image 111 can include pixel values that overlap multiple ones of the defined areas (zones).

Initially, cameras 110 are situated in locations throughout an enterprise (such as a bank but can be other enterprises or even a consumer's home). Each camera lens configured to cover one or more predefined areas (zones) of the physical space of the enterprise.

Furthermore, metadata is assigned to each camera 110 to include a unique camera identifier, a location identifier (representing the physical location that camera 110 is situated within the enterprise, and one or more area identifiers (representing the predefined areas (zones) that the lens of camera 110 captures in the images 111).

Each camera 110 provides time stamp and image-frame stamped images to server 120. These images can be streamed over a wired or wireless connection between cameras 110 and server 120 to a commonly accessible storage area on server 120 that is accessible to zone tracker 123, person tracker 124, object tracker 123, authenticator 126, and auditor 127. In an embodiment, some of the images when streamed from cameras 110 can be buffered or cached in memory of cache and made accessible from the memory or cache to 123-127.

Each accessible image 111 includes its metadata (minimally including what was discussed above) with its image 111 on the server 120.

Zone tracker 123 accesses the images captured/streamed by cameras 110 and assigns a zone identifier for each frame based on the metadata, which includes camera identifiers and defined areas of coverage identifiers. Each zone identifier is used to obtain zone rules from rules 128 that are specific to the zone that corresponds to the zone identifier.

Rules 128 are statements that are interpreted by 123-127 to cause customized processing for purposes of monitoring, authenticating, and auditing specified zones and objects (secure assets) within the zones. The statements are data structures that 123-127 are preconfigured to process and include conditional logic and predefined action identifiers/labels, which map to actions that 123-127 are to perform. Each statement from rules 128 mapped to a zone identifier for a zone, mapped to an object identifier for an object (asset), and may include its own unique rule identifier/rule label.

For example, consider the following rule 128:
Rule Person-Detected. Zone ID=Teller-Area; —if Person present, record until not present go to rule monitor-cash-drawer.

When zone tracker 123 obtains image frames that correspond to a camera 110 having a defined area that matches zone identifier/label of Teller-Area, person tracker 124 and object tracker 125 are provided the frames and look for rules 128 that match the zone identifier. This retrieves the sample rule listed above. The rule is then evaluated and if person tracker 124 detects a person in the frames, person tracker 124 records all such frames with time and date stamps in an audit data store until the person is no longer present in any of the image frames passed by cameras 110. Additionally, person tracker 124 and object tracker 125 are instructed in the rule 128 to retrieve a rule associated with monitoring a cash drawer (an object or secure asset within the teller-area zone). That rule 128 may include statements (sub rules) that instruct person tracker 124 and object tracker 125 to focus on any touching or opening of the cash drawer by the person being tracked and perform additional actions based on such a detection.

It is to be noted that the above example was presented for purposes of illustration and comprehension as rules 128 can be more complex and can identify processing actions for authenticator 126 and/or auditor 127. Furthermore, a rule 128 can include multiple statements or sub-rules as nested rules 128. Rules 128 drive the processing flow and processing actions taken by 123-127. Each enterprise can custom develop rules 128 in accordance with their business requirements for the secure zones and secure assets being monitored.

In an embodiment, system 100 includes a user-facing interface that permits rules 128 to be created, modified, and/or deleted. So, an enterprise does not need to deploy software changes to utilize system 100; rather, an enterprise manages rules 128, which configures and causes 123-127 to perform customized monitoring, authentication, and auditing in accordance with rules 128. This means system 100 is flexible and extensible without software modifications being needed to 123-127.

Some rules 128 can define behaviors or actions taken by a person or asset (object) being tracked, such as holding a key (one object), grasping a door handle (another object), stationary within a zone for a minimum period of elapsed time, multiple persons in a given zone, looking in a direction of a specific camera 110, placing a hand on a specific access device/sensor 130, etc.

Person tracker 122 and object tracker 125 perform image processing on images 110 to identify and track behaviors of persons and objects (secure assets) detected in the images 110. This is done through analysis of pixels included in the images 110 and can be achieved in a variety of manners. For example, because the field-of-view is known for a given camera 110, secure assets represented as objects can be defined as residing in given pixel locations of images 110 taken by camera 110. When pixels for the object become occluded in some manner or represent something other than the object, object tracker 125 knows that an event is occurring that needs to be tracked. A bounding box can be drawn around the pixels that represent the object from training images, these pixels can be sampled to produce values. If the object is non-stationary, the bounding box can be identified in subsequent images 110 for the values to track movements of the object from image frame to image frame. Person tracker 122 can similarly use a bounding box approach with preconfigured attributes for a person and with specific attributes for a known person (employee of the enterprise). Such attributes can include, height, gender, clothing color and type, facial features, skin tone, extremities, shoe color and type, etc. This allows person tracker 124 to create a bounding box around an unknown or known person and track the bounding box from image frame to image frame.

In addition to the above or as a substitute to what was discussed above, person tracker 124 and object tracker 125 may utilize a trained machine-learning or deep learning algorithm that is pre-trained on images of persons and objects to identify and track the persons and objects from image frame to image frame.

Both person tracker 124 and object tracker 125 may also be trained to identify the pre-defined behaviors within the image frames as a person and object are being tracked from frame to frame. The behaviors can include identifiers, which may also corresponding to specific rules 128 to identify processing actions.

Some actions taken by a person while within a monitored zone may also trigger processing actions of authenticator 126 and/or auditor 127. For example, a person may interact with an access device 130, such as a keypad, card reader, biometric enabled device situated on a door to secure zone. Access device 130 reports these affirmative actions taken by the person being tracked to authenticator 126. Authenticator 126 identifies access device 130 that is reporting the action along with the electronic data provided by the person, such as key entries, card information, etc. Authenticator 126 obtains authentication or access control requirements associated with the zone the person is trying to access, the object (asset) the person is trying to access, and/or access device 130. These access control requirements are then enforced by the authenticator 126 before authenticator 126 sends an authorization code back to access device 130 that permits the person to unlock and gain entry to the zone or the asset (object).

The access control requirements may also be defined in customized rules 128 based on a given zone or asset (object), such that the zone identifier or object identifier can be used by authenticator 126 to obtain the specific access control requirements from rules 128.

The access control requirements can be customized to perform a variety of biometric and non-biometric authentication of the person attempting to gain access to a zone or an asset (object).

Auditor 127 is triggered or initiated with any attempt to access a designated zone or object (asset) based on notification from authenticator 126. Specific image frames from cameras 110 are flagged and time synched with the access attempt event in storage along with time and date stamps, asset and zone identifiers, person identifier, length of elapsed time the person is within the zone or has the asset, etc. In fact, the specific types of information that is collected and recorded in audit storage of the access event can be provided in rules 128 based on zone and/or object identifiers.

In an embodiment, Authenticator 126 can be triggered based on actions reported from a user-operated device 140. Here, device 140 includes a mobile application (app) that executes on a process of the device 140 and when initiated establishes a wireless network session with authenticator 126.

In some situations, Authenticator 126 can be initiated/triggered based on behaviors reported by person tracker 124 and/or object tracker 125. That is, a rule 128 instructs person tracker 124 and/or object tracker 125 to call authenticator 126 when a behavior is detected as being a request for access to a given zone and/or asset (object). Such behavior may include looking directly into a specific camera 110, remaining stationary in a given location for an elapsed period of time, making a predefined gesture, and other custom defined behaviors. When authenticator 126 is initiated, an access event is raised, which also activates auditor 127.

The processing associated with authenticator 126 and auditor 127 is discussed in greater detail below with FIG. 2.

Figure 2:
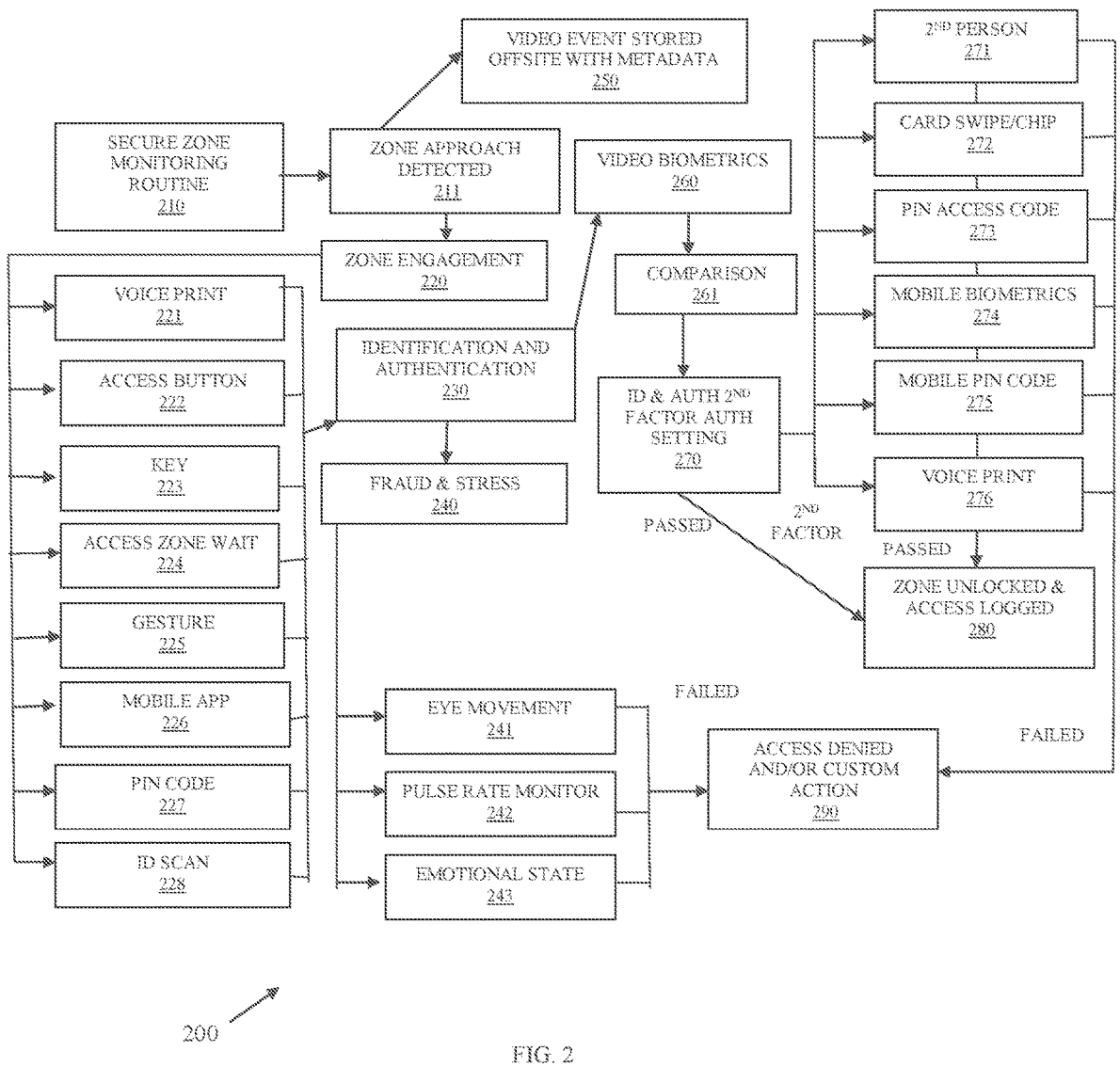
FIG. 2 is a diagram of processing associated with secure zone access, according to an example embodiment.

FIG. 2 is a diagram of processing associated with secure zone access, according to an example embodiment.

The processing depicted in FIG. 2, represents authentication and auditing actions taken primarily by authenticator 126 and auditor 127. Some actions in FIG. 2 represent processing associated with Zone tracker 123, person tracker 124, and object tracker 125 that interact with and initiate more detailed processing of authenticator 126 and auditor 127.

Initially, at 210, the secure zone tracker 123 monitors images 110 and stamps the images 110 with zone identifiers. At 211, a person is detected in a designated zone by person tracker 124. This triggers the person tracker 124, at 250, to stream the image frames having the person to offsite storages along with the image metadata (as discussed above).

A zone engagement behavior is detected by person tracker 124 and/or object tracker 125 and the authenticator 126 is initiated, which raises an access attempt event and activates auditor 127 at 220.

The zone engagement, at 220, may also cause authenticator 126 to be initiated through affirmative actions taken by a person being tracked within the designated zone by the person operating an access device/sensor 130 or a mobile app that processes on a user device 140 (as was discussed above).

Thus, authenticator 126 can be initiated or triggered through a variety of detected events or behaviors of the person being tracked, such as: through a voice print 221 (pre-designated word or phrase) provided by the person through an access device 130 microphone (or user device 140 microphone), an access button 222 pressed on access device 130 or pressed within a mobile app of user device 140, a key 223 provided to the access device 130 or user device 140 (the key can be a physical key inserted into access device 130 or a credential entered into a user-facing interface of mobile app on user device 140), detection of a behavior for the person remaining stationary in the zone 224 for a predetermined period of time (as was discussed above), a gesture 225 made by the person within the zone, the mobile app 226 of user device 140 where an access request is made through the app, a Personal Identification Number (PIN) 227 entered on a keypad of access device 130, and/or an Identification (ID) badge or card swipe or scan 228 made by the person on an access device 130 card reader or scanner.

Once initiated, the authenticator 126 obtains, at 230, the authentication access rules from rules 128 utilizing the corresponding zone and/or object identifier associated with the access request.

Rules 128 may require authenticator 126 to perform a fraud and stress analysis on the person requesting access to the zone/object. At 240, authenticator 126 can perform a variety of fraud and stress processing to determine whether the requesting person is under duress or is stressed in some manner. This can be done by tracking eye movement 241 of the person, comparing a pulse rate 242 of the person (through a sensor 130) against a threshold pulse rate to determine whether the pulse rate is elevated or not, and identifying an emotional state 243 of the person based on the pitch and speed of the person's voice and/or visual detection of agitation of the person. If the fraud and stress testing fails, the person is denied access to the zone/object, at 290, and all collected information from the images 110, the access devices 130, sensors 130, is time and date stamped and logged along with a reason of denial that was made by authenticator 126 (such as pulse rate exceed 120 beats per minute, excessive agitation through movements in the images 110, eye movements were beyond a threshold, etc.).

Assuming, a fraud and stress authentication was required by rules 128 and authenticator 126 passes the person, authenticator 126 performs a biometric identification on the person at 260 represented in images 110. The type of biometric information collected from the person may be defined in rules 128. At 261, the authenticator 126 uses biometric information collected from the images 110 of the person to compare against registered and authorized personnel biometric data for purposes of identifying the person as an identified person.

Authenticator 126 then processes a second factor authentication on the identified person, at 270. Rules 128 can define the type of second factor authentication that authenticator 126 is to perform for the identified person. This can include a variety of second factor authentications, such is an additional person required and present with the identified person ($2^{nd}$ person requirement 271), a card or chip swiped or provided to an access device/sensor 130 by the identified person (at 272), PIN/access code provided to an access device 130 by the identified person (at 273), mobile biometrics collected by user-operated device 140 for the identified person (at 274), mobile PIN code provided by the identified person on user device 140 (at 275), and/or a voice print provided by the identified person on access device/sensor 130 and/or through user device 140 (at 276).

Assuming the second factor authentication is successful, authenticator 126 sends an unlock message/code or an authorization code to unlock the zone/object to access device 130, at 280.

If the second factor authentication fails, the authenticator 126 fails the access request and access is denied at 290.

Successful and unsuccessful access attempts are logged by auditor 127 along with all data collected regarding the access request and any reason for failure. The logged data includes the image frames captured of the person.

System 100 provides a vision driven, biometric, and custom-rules based approach for dynamically tracking behaviors of persons and enforcing access control to secure zones and assets within an enterprise with a detailed audit log. This is particularly useful in banking environments and can be used to replace the traditional manual two-person requirements of banks. System 100 requires minimal user/operator/personnel actions (and in some embodiments none) for gaining access to secure zones and assets while improving the audit trail with indisputable information (entirely electronically captured and logged).

In an embodiment, the enterprise deploying system 100 is a bank.

In an embodiment, the secure zone being monitored through the images 110 is: an area outside a safe access door, an area outside a safety deposit vault, or an area where a cash drawer is located.

In an embodiment, the secure object is: an access panel to an ATM, an access panel to a Point-Of-Sale (POS) terminal, an access panel to a Self-Service Terminal (SST), a safety deposit box, a key used to access a secure zone, a designated computer monitor, or an access door to a secure zone.

In an embodiment, the access device 130 or sensor 130 includes: a scanner, a finger print scanner, a card reader, a retina scanner, a palm scanner, a heart rate monitor a keypad, a keyboard, a touch display, or a computer.

In an embodiment, the user operated device 140 is: a phone, a tablet, a laptop, a wearable processing device, a memory stick, or a device with a chip embedded in it.

It is to be noted that although the illustrations are discussed above within the context of a bank, the system 100 and techniques presented herein and below can be deployed to secure and provide authenticated access to any asset or area. The system 100 and techniques also provided irrefutable audit trails to the asset or area. The area or asset can include, by way of example only: designated areas of any business or research facility, designated equipment of any business or research facility, any safe holding a secure asset, an area of an individual's home or yard, sub-areas within a designated area where confidential information is being monitored and access is restricted, and others.

The above-noted embodiments and other embodiments are now discussed with reference to FIGS. 3-5.

Figure 3:
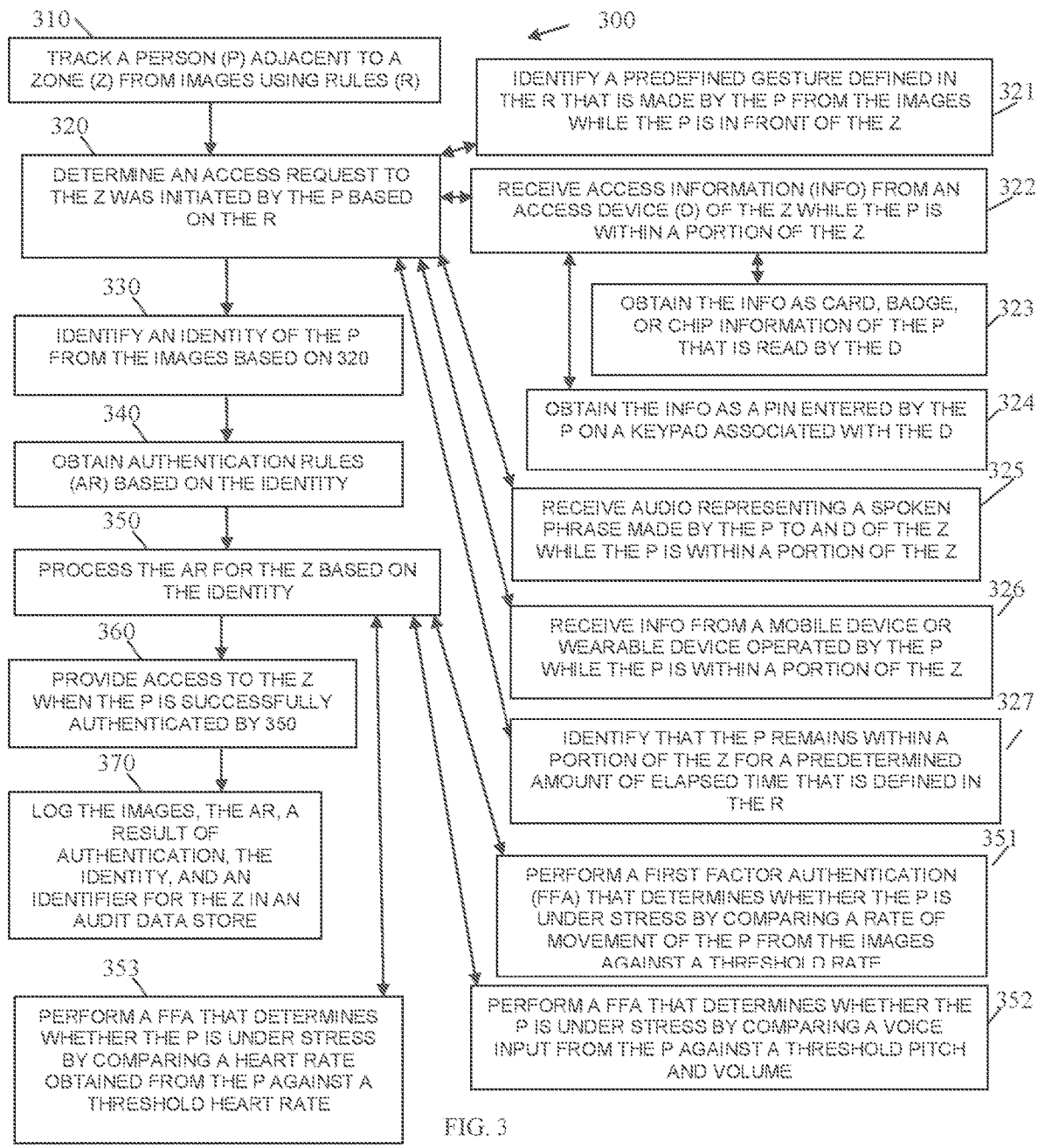
FIG. 3 is a diagram of a method for secure zone access control, according to an example embodiment.

FIG. 3 is a diagram of a method 300 for secure zone access control, according to an example embodiment. The software module(s) that implements the method 300 is referred to as a "zone access controller." The zone access controller is implemented as executable instructions programmed and residing within memory and/or a non-transitory computer-readable (processor-readable) storage medium and executed by one or more processors of a device. The processor(s) of the device that executes the zone access controller are specifically configured and programmed to process the zone access controller. The zone access controller may have access to one or more network connections during its processing. The network connections can be wired, wireless, or a combination of wired and wireless.

In an embodiment, the device that executes the zone access controller is server 120. In an embodiment, server 120 is a cloud-based server, a local-area network (LAN)-based server, or a wide-area network (WAN) server.

In an embodiment, the zone access controller is all or some combination of the zone tracker 123, person tracker 124, object tracker 125, authenticator 126, and/or auditor 127.

At 310, the zone access controller tracks a person adjacent to a zone from images using rules. In an embodiment, the rules are rules 128. Tracking can be achieved in any of the manners discussed above with the FIGS. 1-2.

At 320, the zone access controller determines that an access request to the zone was initiated by the person based on the rules. The rules can defined a plurality of acceptable conditions that indicate an access request is made. Some of the rules are affirmative actions taken by the person while other of the rules are passive behaviors detected in the images that the user engaged in.

In an embodiment, at 321, the zone access controller identifies a predefined gesture that is defined in the rules and that is made by the person from the images while the person is in front of or within a portion of the zone.

In an embodiment, at 322, the zone access controller receives access information from an access device of the zone while the person is in front of or within a portion of the zone. The access device can be any of the above-mentioned access devices/sensors 130 and/or any of the above-mentioned user-operated devices 140.

In an embodiment of 322 and at 323, the zone access controller obtains the access information as card information, badge information, or chip information of the person that is read by the access device. This may be through an automated reading (such as a Radio Frequency (RF) scanner) or through a user-provided swiped or presented card or badge (such as through an optical scanner or magnetic card stripe reader).

In an embodiment of 322 and at 324, the zone access controller obtains the access information as a PIN entered by the person on a keypad or touchscreen associated with the access device.

In an embodiment, at 325, the zone access controller receives audio representing a spoken phrase made by the person to an access device while the person is in front of or within a portion of the zone.

In an embodiment, at 326, the zone access controller receives the access information from a mobile application that executes on a mobile device or a wearable processing device that is operated by the person while the person is in front of or within a portion of the zone.

In an embodiment, at 327, the zone access controller identifies that the person remains in front of or within a portion of the zone for a predetermined amount of elapsed time that is defined in the rules.

At 330, the zone access controller identifies an identity of the person from the images based on 320. For example, the zone access controller uses facial features obtained from one of the cameras to perform facial recognition on the person and map the person to the known identity for a known person.

At 340, the zone access controller obtains authentication rules based on the identity and the zone. The authentication rules identify how many authentications and each type of authenticated needed for the person to gain access to the zone.

At 350, the zone access controller processes the authentication rules for the zone based on the identity of the person.

In an embodiment, at 351, the zone access controller performs a first factor authentication that determines whether the person is under stress by comparing a rate of movement of the person from the images against a threshold rate of movement for a person believed not to be under stress or believed to be under stress. The stress analysis can be for emotion detection/recognition or sentiment analysis. That is, predefined characteristics associated with stress/emotion/sentiment are gathered and evaluated in view of what is considered to be characteristics that exhibit known stress/emotion/sentiment situations to determine whether the person is under stress or not under stress.

In an embodiment, at 352, the zone access controller performs a first factor authentication that determines whether the person is under stress by comparing a voice input provided by the person against a threshold pitch and volume for a person believed not to be under stress or believed to be under stress.

In an embodiment, at 353, the zone access controller performs a first factor authentication that determines whether the person is under stress by comparing a heart rate obtained from the person against a threshold heart rate for a person believed not to be under stress or believed to be under stress.

At 360, the zone access controller provides access to the zone when the person is successfully authenticated by 350. This can be an electronic message sent to an access device that instructs the access device to unlock an access door or a latch to the secure zone.

According to an embodiment, at 370, the zone access controller logs the images, the authentication rules, a result from authentication, the identity of the person, and an identifier for the zone in an audit data store along with a date and time stamps.

Figure 4:
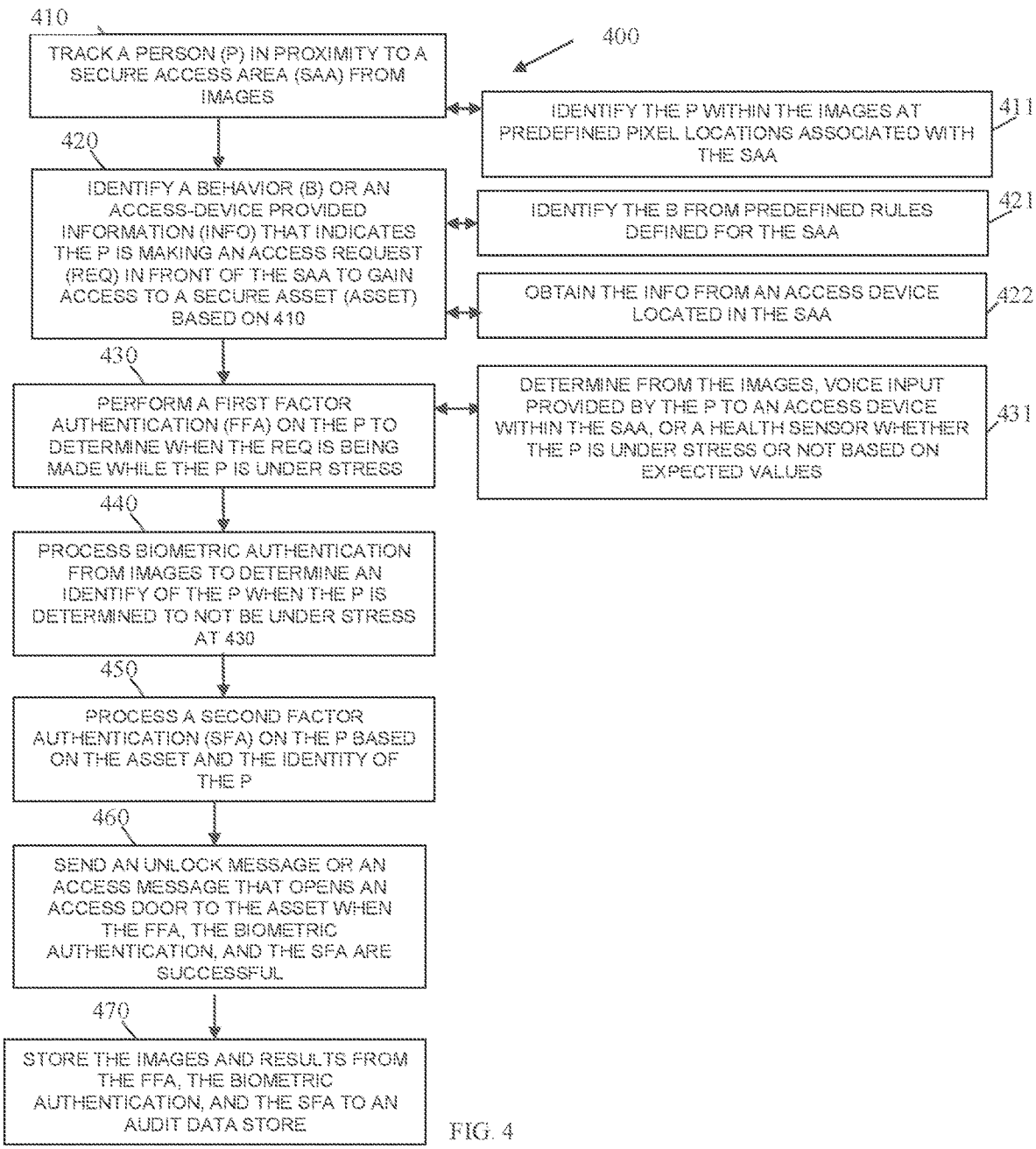
FIG. 4 is a diagram of another method for secure zone access control, according to an example embodiment.

FIG. 4 is a diagram of another method 400 for secure zone access control, according to an example embodiment. The software module(s) that implements the method 400 is referred to as an "authenticator." The authenticator is implemented as executable instructions programmed and residing within memory and/or a non-transitory computer-readable (processor-readable) storage medium and executed by one or more processors of a device. The processors that execute the authenticator are specifically configured and programmed to process the authenticator. The authenticator may have access to one or more network connections during its processing. The network connections can be wired, wireless, or a combination of wired and wireless.

In an embodiment, the device that executes the authenticator is the server 120. In an embodiment, the server 120 is a cloud processing environment, a LAN server, or a WAN server.

In an embodiment, the authenticator is all of or some combination of: zone tracker 123, person tracker 124, object tracker 125, authenticator 126, auditor 127, and/or the method 300.

The authenticator presents another and in some ways enhanced processing perspective of the method 300 discussed above.

At 410, the authenticator tracks a person in proximity to a secure access area from images.

In an embodiment, at 411, the authenticator identifies the person within the images at predefined pixel locations associated with the secure access area.

At 420, the authenticator identifies a behavior or an access-defined provided information that indicates the person is making an access request in front of the secure access area to gain access to a secure asset based on 410.

In an embodiment, at 421, the authenticator identifies the behavior from predefined rules defined for the secure access area.

In an embodiment, at 422, the authenticator obtains the access-defined provided information from an access device located in the secure access area. In an embodiment, the access device is access device/sensor 130. In an embodiment, the access device is user-operated device 140.

At 430, the authenticator performs a first factor authentication on the person to determine when the access request is being made while the person is under stress.

In an embodiment, at 431, the authenticator determines from the images, voice input provided by the person to an access device within the secure access area, and/or a health sensor whether the person is believed to be under stress or not based on expected values.

At 440, the authenticator processes a biometric authentication from the images to determine a registered identity of the person when the person is determined to not be under any stress at 430.

At 450, the authenticator processes a second factor authentication on the person based on the secure asset and the identity of the person.

At 460, the authenticator sends an unlock message or an access message that opens an access door/latch to the secure asset when authentications at 430, 440, and 450 are successful for the person.

At 470, the authenticator stores time and date stamped images and results from the processing at 430, 440, and 450 to an audit data store. The stored audit information includes the resolved registered identity for the person.

Figure 5:
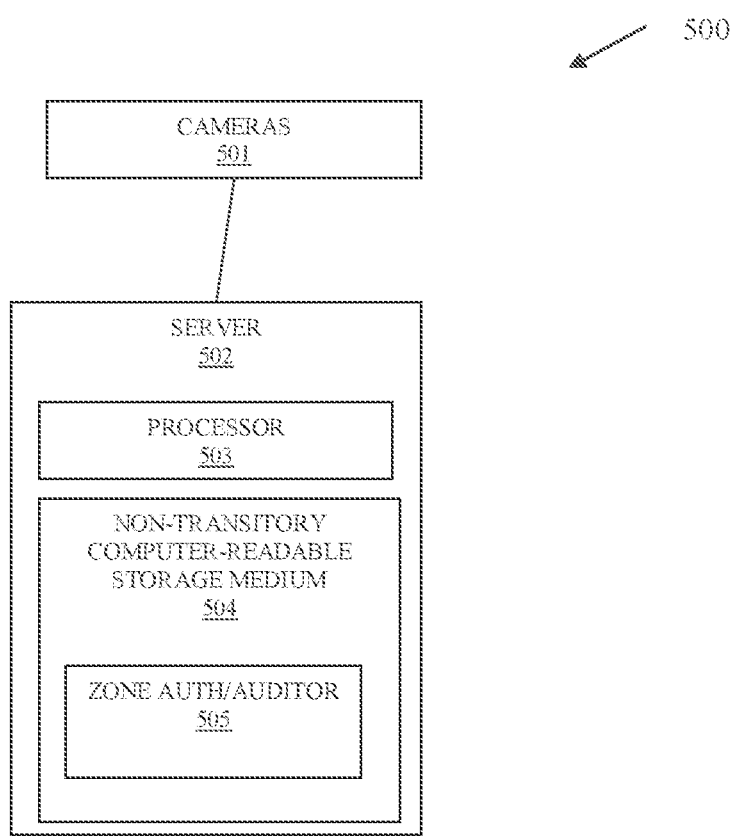
FIG. 5 is a diagram of another system for secure zone access control, according to an example embodiment.

FIG. 5 is a diagram of a system 500 for secure zone access control, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

In an embodiment, system 500 is the cameras 110 and the server 120.

The system 500 includes a plurality of cameras 501 and a server 502. The server 502 includes at least one hardware processor 503, a non-transitory computer-readable storage medium 504 having executable instructions representing a zone authenticator/auditor 505.

The zone authenticator/auditor 505 when executed from the non-transitory computer-readable storage medium 504 on the processor 503 is configured to cause the processor 503 to: 1) track a person in the images provided by the cameras 501; 2) determine when the person is located in front of or within a portion of a secure zone; 3) determine when the person makes an access request to access the secure zone while the person is in front of or within a portion of the secure zone; 4) perform a stress analysis to determine whether the person is making the access request under stress; 5) process a biometric authentication on the person to determine an identify of the person from the images when the person is not under stress; 6) process a secure zone authentication against the identity of the person based on a secure asset associated with the secure zone and credentials known for the identity of the person; 7) unlock an access door to the secure asset when the identity of the person is authenticated with supplied credentials provided by the person against the credentials; and 8) log the images, the identity, an identifier for the secure asset, and results associated with the stress analysis, the biometric authentication, and the secure zone authentication in an audit store.

In an embodiment, the zone authenticator/auditor 505 is all or some combination of: zone manager 123, person tracker 124, object tracker 125, authenticator 126, auditor 127, method 300, and/or method 400.

In an embodiment, the zone authenticator/auditor 505 is further configured when executed by processor 503 from non-transitory computer-readable storage medium 504 to cause processor 503 to, identify the access request as a predefined gesture made by the person while in front of or within a portion of the secure zone from the images.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   tracking a person adjacent to a zone from images using first rules, wherein the images are taken of the person and comprise image frames with identifiers for granting access to the zone;
   determining, based on the first rules, an access request to the zone was initiated by the person, wherein the determining of the access request further includes evaluating the first rules and determining the access request to the zone was made by the person when the images indicate one or more of: the person remains stationary for a minimum period of time, an additional person is with the person, a hand of the person is placed on a specific device/sensor, and the person is holding a key;
   identifying an identity of the person from the images based on the determining of the access request;
   obtaining authentication rules for the zone based on the identified identity of the person;
   establishing a first factor authentication of the person upon the identified identity;
   wherein the first factor authentication comprises analysis of stress of the person;
   wherein if the analysis of stress is above a threshold, further factor authentications are performed on the person, with second rules, until the analysis of stress is below the threshold or the second rules verify that the person is not committing fraud or is not in danger;
   processing the authentication rules or the second rules;
   providing access to the zone when the person is successfully authenticated by the processing of the authentication rules or the second rules, based on the first factor authentication or the further factor authentications;
   processing other rules associated with subsequent images and performing customized processing for monitoring and auditing actions of the person with respect to objects present in the zone when access to the zone is provided to the person based on the first factor authentication or the further factor authentications.

2. The method of claim 1, wherein determining further includes identifying a predefined gesture defined in the first rules that is made by the person from the images while the person is within a portion of the zone.

3. The method of claim 1, wherein determining further includes receiving access information from an access device of the zone while the person is within a portion of the zone.

4. The method of claim 3, wherein receiving further includes obtaining the access information as card information, badge information, or chip information of the person that is read by the access device.

5. The method of claim 3, wherein receiving further includes obtaining the access information as a Personal Identification Number (PIN) entered by the person on a keypad associated with the access device.

6. The method of claim 1, wherein determining further includes receiving audio representing a spoken phrase made by the person to an access device of the zone while the person is within a portion of the zone.

7. The method of claim 1, wherein determining further includes receiving access information from a mobile device or wearable device operated by the person while the person is within a portion of the zone.

8. The method of claim 1, wherein determining further includes identifying that the person remains in front of the zone for a predetermined amount of elapsed time that is defined in the first rules.

9. The method of claim 1, wherein establishing further includes evaluating the second rules by comparing a rate of movement of the person from the images against the threshold that represents a threshold rate of movement for determining whether the person is under stress.

10. The method of claim 1, wherein establishing further includes evaluating the second rules by comparing a voice input from the person against the threshold that represents a threshold pitch and volume for determining whether the person is under stress.

11. The method of claim 1, wherein establishing further includes evaluating the second rules by comparing a heart rate obtained from the person against the threshold that represents a threshold heart rate.

12. The method of claim 1 further comprising, logging the images, the authentication rules, a result of authentication, the identity, and an identifier for zone in an audit data store.

13. A method, comprising:
   tracking a person in proximity to a secure access area from images using first rules, wherein the images are taken of the person and comprise image frames with identifiers for granting access to the secure access area;
   identifying a behavior of the person or access-device provided information that indicates the person is making an access request in front of the secure access area to gain access to a secure asset based on the tracking the person using the first rules, wherein the identifying further includes identifying specific behaviors from the images that when present indicate the access request was made by the person based on one or more of: the person remains stationary for a minimum period of time, an additional person is with the person, a hand of the person is placed on a specific device/sensor, and the person is holding a key;

performing a first factor authentication on the person by performing analysis of stress of the person and when stress of the person is above a threshold performing further factor authentications on the person, with second rules, until analysis of stress is below the threshold or the second rules verify the person is not committing fraud or is not in danger;

processing biometric authentication from the images to determine an identity of the person when the person is determined to not be under stress, not committing fraud, or is not in danger;

processing a third factor authentication on the identity of the person based on the secure asset and the identity of the person;

sending an unlock message or an access message that opens an access door to the secure asset when the first factor authentication, the further factor authentications, the biometric authentication, and the third factor authentication are successful; and processing different rules associated with subsequent images and performing customized processing for monitoring and auditing actions of the person with respect to objects associated with the secure asset when the access door is opened for the person.

14. The method of claim 13 further comprising, storing the images and results from the first factor authentication, the further factor authentications, the biometric authentication, and the third factor authentication to an audit data store.

15. The method of claim 13, wherein tracking further includes identifying the person within the images at predefined pixel locations associated with the secure access area.

16. The method of claim 13, wherein identifying further includes identifying the behavior from predefined rules defined for the secure access area.

17. The method of claim 13, wherein identifying further includes obtaining the access-device provided information from an access device located in the secure access area.

18. The method of claim 13, wherein performing further includes obtaining voice input provided by the person to an access device within the secure access area or obtaining health data from a health sensor for the person, and comparing the voice input or the health data against the threshold to determine whether the person is under stress or not when performing the further factor authentications using the second rules.

19. A system, comprising:
cameras configured to capture images within a store;
a server that includes a processor and a non-transitory computer-readable storage medium;
the non-transitory computer-readable storage medium including executable instructions;
the executable instructions when executed on the processor from the non-transitory computer-readable storage medium causing the processor to:
track a person in the images provided by the cameras using first rules, wherein the images are taken of the person and comprise image frames with identifiers for granting access to a secure zone;
determine when the person is located within a portion of a secure zone based on the first rules;
determine when the person makes an access request to access the secure zone while the person is within the portion of the secure zone based on evaluating the first rules and based on the images indicating one or more of: the person remains stationary for a minimum period of time, an additional person is with the person, a hand of the person is placed on a specific device/sensor, and the person is holding a key;
perform a first factor authentication on the person by performing analysis of stress of the person and when stress of the person is above a threshold performing further factor authentications on the person, with second rules, until analysis of stress is below the threshold or the second rules verify the person is not committing fraud or is not in danger;
process a biometric authentication on the person to determine an identity of the person from the images when the person is not under stress, not committing fraud, or is not in danger;
process a secure zone authentication against the identity of the person based on a secure asset associated with the secure zone and credentials known for the identity of the person;
unlock an access door to the secure asset when the identity of the person is authenticated with supplied credentials provided by the person against the credentials;
process different rules associated with subsequent images and performing customized processing for monitoring and auditing actions of the person with respect to objects associated with the secure asset when the access door is unlocked for the person; and
log the images, the subsequent images, the actions, object identifiers for the objects, the identity, an identifier for the secure asset, and results associated with the first factor authentication, the further factor authentications, the biometric authentication, and the secure zone authentication in an audit store.

20. The system of claim 19, wherein the executable instructions when executed by the processor from the non-transitory computer-readable storage medium is further configured to cause the processor to identify the access request as a predefined gesture made by the person while within the portion of the secure zone from the images using the first rules.

* * * * *